United States Patent
Tse

(10) Patent No.: US 6,297,979 B1
(45) Date of Patent: Oct. 2, 2001

(54) IN-RUSH CURRENT CONTROLLER WITH CONTINUOUS CYCLE-BY-CYCLE CONTROL

(75) Inventor: Man Sing Tse, Hong Kong (HK)

(73) Assignee: PI Electronics (Hong Kong) Limited, Kowloon (HK)

( * ) Notice: Subject to any disclaimer, the term of this patent is extended or adjusted under 35 U.S.C. 154(b) by 0 days.

(21) Appl. No.: 09/468,311

(22) Filed: Dec. 21, 1999

(30) Foreign Application Priority Data

Dec. 31, 1998 (GB) .................................................. 9828881

(51) Int. Cl.[7] .................................................. H02H 7/125
(52) U.S. Cl. .............................................. 363/86; 323/908
(58) Field of Search .............................. 323/908; 363/86, 363/126

(56) References Cited

U.S. PATENT DOCUMENTS

| | | | |
|---|---|---|---|
| 4,555,741 | * 11/1985 | Masaki | 323/908 |
| 4,855,649 | * 8/1989 | Masaki | 323/908 |
| 4,982,306 | * 1/1991 | Koroncai et al. | 323/908 |
| 5,420,780 | * 5/1995 | Bernstein et al. | 363/89 |
| 5,715,154 | * 2/1998 | Rault | 363/89 |
| 5,995,392 | * 11/1999 | Turner | 323/908 |
| 6,018,473 | * 1/2000 | Claassen | 363/126 |

\* cited by examiner

*Primary Examiner*—Jeffrey Sterrett
(74) *Attorney, Agent, or Firm*—Leydig, Voit & Mayer, Ltd.

(57) ABSTRACT

An in-rush current controller for a mains power rectification circuit including a full wave rectifier and a capacitor. A serial resistor suppresses in-rush currents. The controller includes a sensing circuit that controls a pair of silicon controlled rectifiers to cyclically shunt or isolate the resistor during normal operation. Thus, power is not dissipated by the resistor and undesirable heat is not generated during normal operation. The sensing circuit responds to abrupt rises in voltage (typical of in-rush current conditions) to inhibit turn ON of the rectifiers so that the resistor is not shunted or isolated at such times.

14 Claims, 1 Drawing Sheet

IN-RUSH CURRENT CONTROLLER WITH CONTINUOUS CYCLE-BY-CYCLE CONTROL

BACKGROUND OF THE INVENTION

1. Field of the Invention

The invention relates to inrush current controllers.

2. Description of Prior Art

Mains power rectification circuits use a large value E-cap an electrolyte capacitor (known as bulk-cap). When AC power is first applied to the rectifier circuit, depending on the instantaneous voltage across the mains line, there may be a large charging current (known as inrush current) flowing through the bulk-cap. Such current, if not limited, may reach a few hundred Amperes. Input connections, fuse, power switch, or the rectifiers may be damaged by such high currents.

One way to control the inrush current is to put a resistor in series with the input circuit. In order to limit the inrush current to a safe level, the serial resistance needs to be comparatively large. Such a large resistance is unnecessary during normal operation and wastes power and generates undesirable heat.

An alternative to a fixed serial resistor is to use a negative temperature coefficient resistor known as an NTC resistor. The resistance of an NTC is large at normal ambient temperature but is significantly reduced when hot. This approach does not necessarily solve the inrush current problem. Firstly, the NTC resistor must be kept hot for its resistance to remain reduced, so that heat generation and power loss are unavoidable. Secondly, once heated, the NTC resistor will take a few seconds to cool down. If the AC power is switched on again while the NTC resistor is still warm, the inrush current will not be reduced.

Another alternative is to use a timed switch to shunt the inrush current limiting resistor following an AC turn on. This timed switch is turned OFF after the AC input is disconnected, usually after the voltage of some internal DC power rail has dropped following the AC disconnection. This approach suffers from a similar problem as using an NTC resistor. The switch takes some time to return to an open state so the AC power cannot be reconnected too soon after disconnection. Otherwise, the limiting resistor will still be shunted by the timed switch and the subsequent inrush current will not be limited.

SUMMARY OF THE INVENTION

It is an object of the invention to overcome or at least reduce this problem.

According to the invention there is provided an inrush current controller for a mains power rectification circuit having a serial resistor for limiting the inrush current, including a sensing circuit arranged to automatically monitor the inrush current and to electrically isolate the serial resistor whenever the current is below a predetermined value.

The serial resistor is preferably an NTC resistor.

The sensing circuit may be arranged to respond to a rate-of-rise of input voltage and to electrically isolate the serial resistor only if the rate-of-rise is below a predetermined value.

The sensing circuit may include a pair of silicon controlled rectifiers arranged to be sequentially controlled to be shunted across the serial resistor so as to isolate the resistor in each respective current cycle when the inrush current is below the predetermined value.

Circuit means may be included and arranged to trigger each silicon controlled rectifier prior to each conduction cycle to inhibit electrical noise emission.

BRIEF DESCRIPTION OF THE DRAWING

An inrush current controller for a mains rectification circuit according to the invention will now be described by way of example with reference to the accompanying circuit drawing.

DESCRIPTION OF THE PREFERRED EMBODIMENTS

Figure 1:
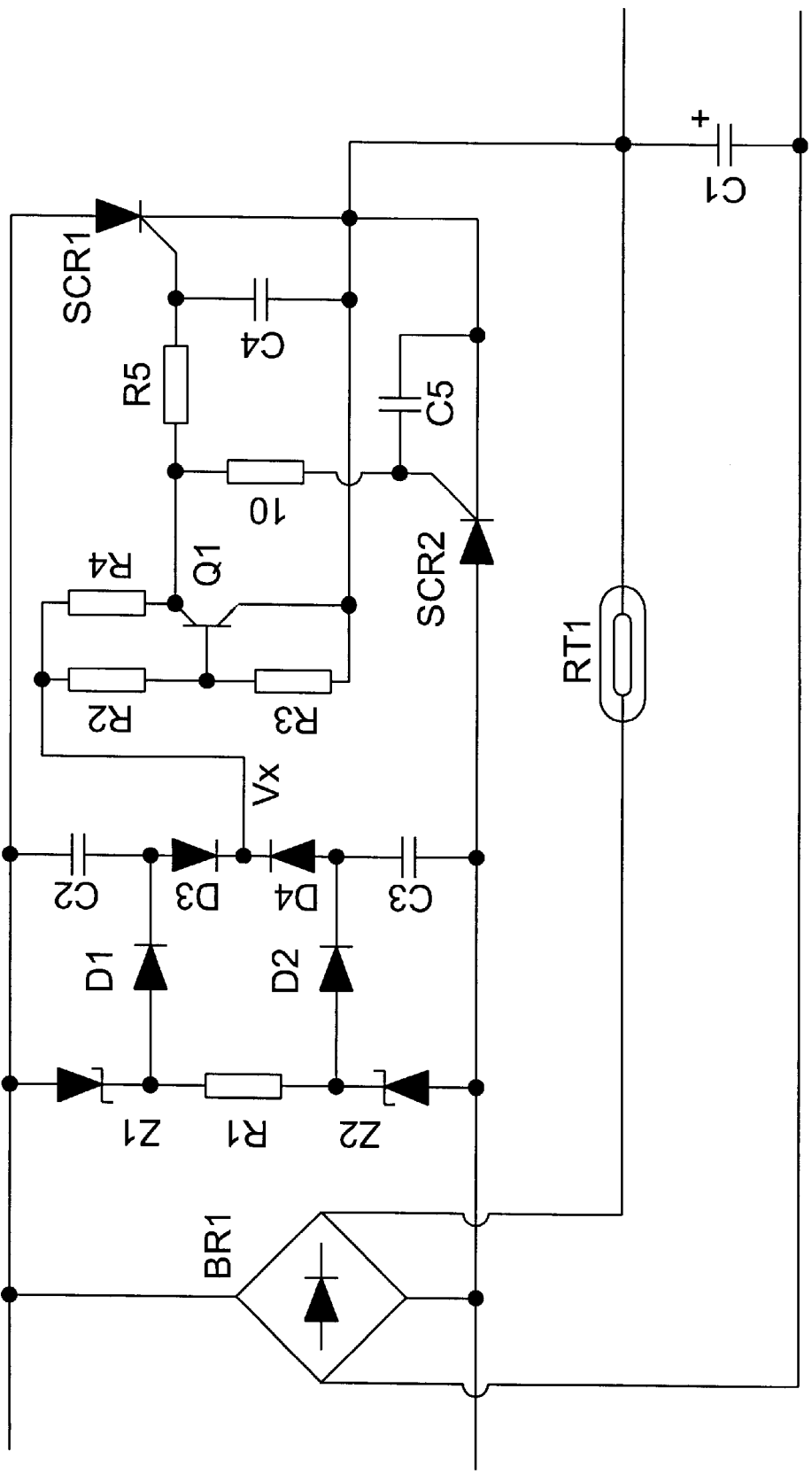

Referring to the drawing, a mains rectifying circuit comprises a full wave rectifier BR1, and a capacitor C1. A serial NTC resistor RT1 is included for limiting inrush current that could otherwise damage the components of the rectifying circuit, and other related components as explained above. As is known, the resistor RT1 limits inrush currents when the resistor is at ambient temperature. At higher and normal operating temperatures, the resistance of the RT1 resistor is comparatively reduced so as not to limit normal operating currents. However, the RT1 resistor inherently consumes and wastes some power during operation and undesirably generates heat.

In the described circuit, silicon controlled rectifiers SCR1 and SCR2 are cyclically and automatically turned ON to shunt the resistor RT1 when the actual inrush currents, after switch ON, have settled to negligible values. Thus, the resistor RT1 receives no current, saving power previously lost, and during normal periods of operation the resistor RT1 cools or remains cool so as to be always in a condition to suppress any further inrush currents that occur (at a next switch ON, for example).

Rectifiers SCR1 and SCR2 cannot turn ON to shunt (i.e., to isolate) the resistor RT1 when a transistor Q1 is ON. The transistor Q1 will be ON when the inrush current is above a predetermined, threshold current to cause a potential difference across the resistor RT1, such that a B-E junction at the transistor Q1 is forward biased (via a potentiometer formed by resistors R2 and R3).

The inrush current occurs at switch ON (or plug in) and the line voltage rises abruptly. Under normal conditions, the line voltage rises cyclically and less abruptly as a sine curve. The described circuit is designed to distinguish between a normal sine-curve rise of voltage and a more abrupt rise (or fall). If one half of each cycle is considered, rectifier SCR1 is turned ON with about 1 volt across a capacitor C4, and resistors R4 and R5. Capacitors C4 provides a time delay to $V_X$. If $V_X$ is rising very quickly, the voltage across capacitor C4 will not reach 1 volt before Q1 turns ON. Hence, when $dV_X/dt$ is high (typical of an inrush current condition), the rectifier SCR1 is inhibited from shunting or isolating the resistor RT1. (The rectifier SCR2 is controlled and/or inhibited in similar manner.) When $V_X$ rises more slowly, the voltage across the capacitor C4 will follow $V_X$, with a tracking error.

$$V\_C4 \approx V_X - V\_err$$

where, $V\_err = dV_X/dt \times TC$ where, $TC = (R4 + R5 // R6) \times (C4 + C5)$ where, $R5 // R6 = R5 \times R6 / (R5 + R6)$ Q1 will turn on when $V_X = V_{xk}$, $$V_{xk} \simeq V_{be}(on) \times (R2+R3)/R3,$$

the critical dVx/dt, m_k, which differentiates whether the SCRs trigger is, $$m\_k \simeq [V_{xk} - V_g(on)]/TC \simeq V_{xk}/TC$$

where, Vg(on) is the gate turn-on voltage of the SCRs which is approximately equal to 1 V, and is made much smaller than Vxk by design.

However, the rectifiers SCR1 and SCR2 will take some time to turn ON. The RC element at their trigger pins, i.e., gates, worsens the delay. If SCRs were allowed to turn ON after a few volts had been developed across their body terminals (anode/cathode), the turn ON will induce considerable and generally unacceptable broad-band conduction noise (emission). The described circuit incorporates components to overcome this problem.

Capacitors C2 and C3 are charged to about 10 volts, in a direction to forward bias both diodes D3 and D4, by a regulation and rectifying network formed by a resistor R1, Zener diodes Z1 and Z2, and diodes D1 and D2. Voltages at capacitors C2 and C3 stack on respective AC input line voltages. In this way, the voltages seen by the SCR switching circuit is about 10 volts higher than the AC line voltages at any moment so that the SCRs are about to be forward biased. This 10 volt offset allows the SCRs to turn ON slightly ahead of the time that they are forward biased. Hence, the SCRs are triggered before the conduction cycle begins. In this way, the turn-ON noise is eliminated.

The described circuit using a serial NTC resistor, or a suitable fixed-value serial resistor, for suppressing inrush currents (known per se) incorporates a sensing, i.e., control circuit, to automatically overcome power loss and undesirable heating common in earlier proposals. In addition, in the described embodiment, noise suppression is provided by triggering a pair of silicon controlled rectifiers that shunt or isolate the serial resistor before each of their respective conduction cycles.

I claim:

1. An in-rush current controller for controlling a current flowing into an AC mains power rectification circuit, the controller having:

a serial resistor for limiting an in-rush current flowing into the rectification circuit, and a sensing circuit automatically monitoring the in-rush current flowing into the rectification circuit in each half cycle of the in-rush current flowing into the rectification circuit, and electrically isolating the serial resistor whenever, half cycle by half cycle, the in-rush current flowing into the rectification circuit is below a threshold current, the sensing circuit including a pair of silicon controlled rectifiers sequentially controlled to shunt and isolate the serial resistor in each respective current half cycle only when the in-rush current is below the threshold current during that half cycle.

2. The in-rush current controller according to claim 1, wherein the serial resistor is a negative temperature coefficient resistor.

3. An in-rush current controller for controlling a current flowing into an AC mains power rectification circuit, the controller having:

a serial resistor for limiting an in-rush current flowing into the rectification circuit, and a sensing circuit automatically monitoring the in-rush current and electrically isolating the serial resistor whenever the current flowing into the rectification circuit is below a threshold current, the sensing circuit including a pair of silicon controlled rectifiers sequentially controlled to shunt and isolate the serial resistor in each respective current cycle when the in-rush current is below the threshold current, the sensing circuit responding to a rate-of-rise of an input voltage applied to the rectification circuit and electrically isolating the serial resistor only if the rate-of-rise is below a threshold rate-of-rise.

4. The in-rush current controller according to claim 3, wherein the serial resistor is a negative temperature coefficient resistor.

5. An in-rush current controller for controlling a current flowing in an AC mains power rectification circuit, the controller comprising:

a serial resistor for limiting an in-rush current flowing into the rectification circuit, a sensing circuit automatically monitoring the in-rush current and electrically isolating the serial resistor whenever the current flowing into the rectification circuit is below a threshold current, the sensing circuit including a pair of silicon controlled rectifiers sequentially controlled to shunt and isolate the serial resistor in each respective current cycle when the in-rush current is below the threshold current, and circuit means for triggering each silicon controlled rectifier prior to each conduction cycle of the current flowing into the rectification circuit to inhibit electrical noise emission.

6. The in-rush current controller according to claim 5, wherein the serial resistor is a negative temperature coefficient resistor.

7. An in-rush current controller for controlling a current flowing into an AC mains power rectification circuit, the controller having:

a serial resistor for limiting an in-rush current flowing into the rectification circuit in each half cycle of a current flowing into the rectification circuit, and a sensing circuit automatically monitoring rate-of-rise of instantaneous voltage applied to the rectification circuit and electrically isolating the serial resistor whenever the rate-of-rise is below a threshold rate-of-rise.

8. The in-rush current controller according to claim 7, wherein the serial resistor is a negative temperature coefficient resistor.

9. The in-rush current controller according to claim 8, wherein the sensing circuit responds to the in-rush current applied to the rectification circuit and electrically isolates the serial resistor only if the in-rush current is below a threshold current.

10. The in-rush current controller according to claim 9, in which the sensing circuit includes a pair of silicon controlled rectifiers sequentially controlled to shunt and isolate the serial resistor in each half cycle of the current flowing into the rectification circuit when the rate-of-rise and the in-rush current are below the respective threshold rate-of-rise and threshold current.

11. The in-rush current controller according to claim 10, including circuit means for triggering each silicon controlled rectifier prior to each conduction cycle of the current flowing into the rectification circuit to inhibit electrical noise emission.

12. The in-rush current controller according to claim 7, wherein the sensing circuit responds to the in-rush current applied to the rectification circuit and electrically isolates the serial resistor only if the in-rush current is below a threshold current.

13. The in-rush current controller according to claim 12, in which the sensing circuit includes a pair of silicon controlled rectifiers sequentially controlled to shunt and isolate the serial resistor in each half cycle of the current flowing into the rectification circuit when the rate-of-rise and the in-rush current are below the respective threshold rate-of-rise and threshold current.

14. The in-rush current controller according to claim 13, including circuit means for triggering each silicon controlled rectifier prior to each conduction cycle of the current flowing into the rectification circuit to inhibit electrical noise emission.

\* \* \* \* \*